Figure 1:
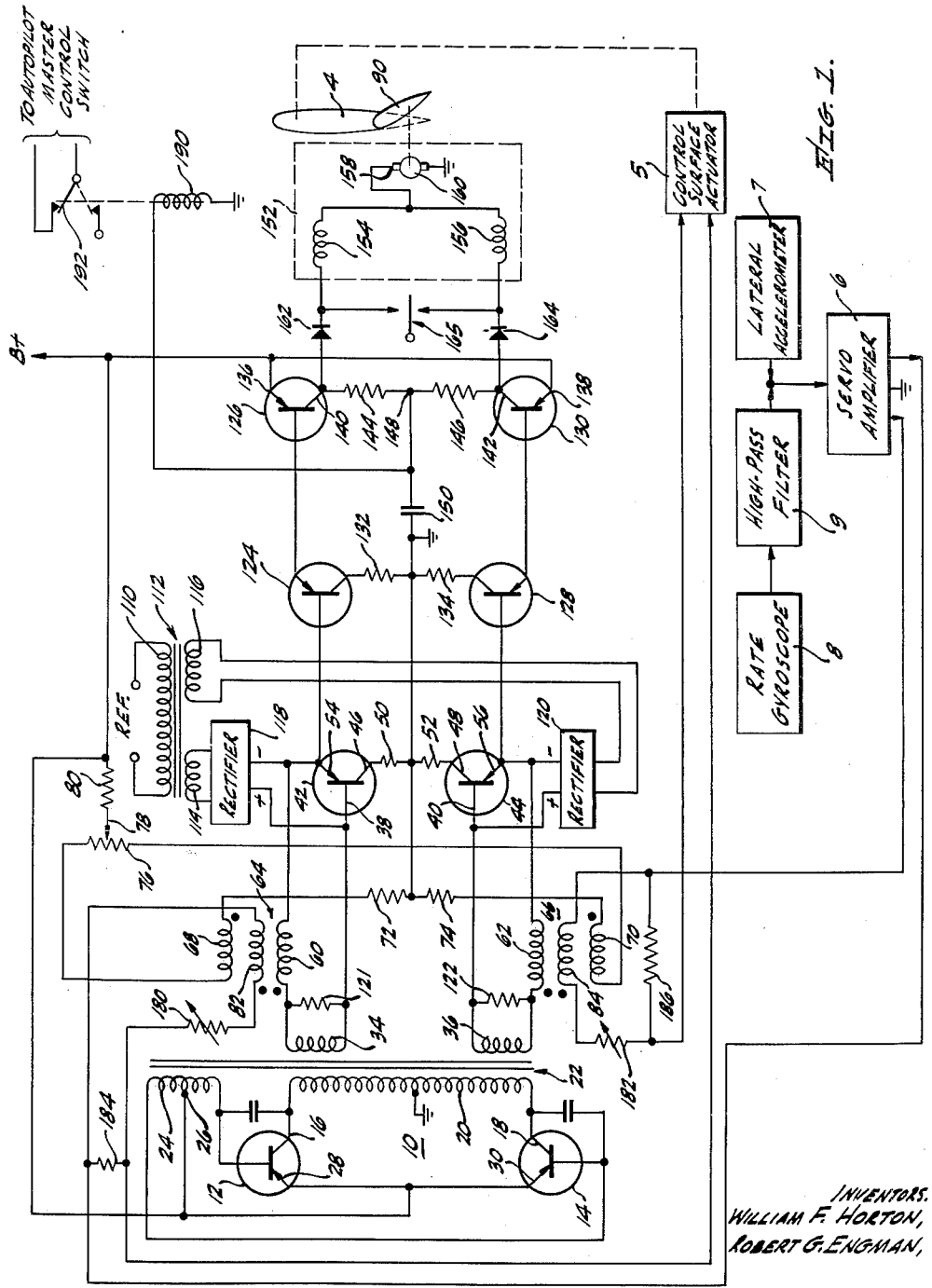

INVENTORS.
WILLIAM F. HORTON,
ROBERT G. ENGMAN,

BY Perry E. Turner
AGENT.

Jan. 23, 1962 W. F. HORTON ET AL 3,018,071
TRIM CONTROL SYSTEM FOR AUTOPILOTS
Filed Aug. 1, 1957 2 Sheets-Sheet 2

INVENTORS.
WILLIAM F. HORTON,
ROBERT G. ENGMAN,
BY
Perry E. Turner
AGENT.

United States Patent Office

3,018,071
Patented Jan. 23, 1962

3,018,071
TRIM CONTROL SYSTEM FOR AUTOPILOTS
William F. Horton, Malibu, and Robert G. Engman, Santa Monica, Calif., assignor to Lear, Incorporated
Filed Aug. 1, 1957, Ser. No. 675,595
5 Claims. (Cl. 244—77)

This invention relates to means for positioning control surfaces of an aircraft, and more particularly to means for adjusting the trim tab portion of a main control surface to relieve the servo mechanism of this function and to permit such servo to be utilized solely to control the main control surface.

As is well known, various factors contribute to conditions under which an aircraft must be trimmed in flight. For example, a two-engine aircraft may have a tendency to yaw due to differential thrust of the engines. If the actuator for the main rudder surface were used alone to counteract this tendency, it would be commanded by an amplified error or correction signal to position the main rudder surface so as to keep the aircraft in level trim. If the force tending to produce the yaw is substantially constant, the command signal would persist and the rudder actuator would have to operate continuously in response thereto to hold the rudder in the desired position for level trim. This is obviously undesirable, as a constant load on the rudder actuator would shorten its life, and it may burn out at a time when it is most needed. To avoid such consequences, it is preferable, and customary, to move the rudder trim surface, i.e., the trim tab, to a position where it alone can keep the aircraft in trim, thereby relieving the rudder actuator and main rudder surface of this function. The main rudder surface and its actuator are then free to be used to correct for transient conditions and to keep the aircraft in the desired attitude. But the windings of the trim surface control motor require the application thereto of control voltages of predetermined magnitude in order to effect response of such moor to command signals; also, control voltages of the required magnitude must be available even where the trim tab is only slightly off the correct position for trim purposes, i.e., where the corresponding error signals are small. Further, such motor necessarily must not be operated continuously, else the trim tab may be moved to positions where control of the aircraft would be lost.

It is an object of this invention to provide improved trim servo control means for aircraft, whereby the trim surface control motor is provided with voltages of the same magnitude in all off-trim positions of the trim surface, and whereby such motor is prevented from operating continuously.

It is another object of this invention to provide an improved trim surface control system for autopilots, wherein the trim surface control motor is operated in response to voltage pulses developed from direct current signals of magnitudes representing amounts of off-trim, wherein such pulses are of constant magnitude, and wherein the duration of such pulses corresponds to the off-trim position of the trim surface, whereby the averaged speed of the trim surface control motor is proportional to the amount of off-trim.

It is a further object of this invention to provide, for a trim surface control system, a unique magnetic amplifier arrangement utilizing a saturable-core reactor having bias, control and load windings together with the emitter-base circuit of a transistor to develop constant amplitude pulses of duration corresponding to a control voltage used to energize the control winding.

The above and other objects and advantages of this invention will become apparent from the following description, taken in conjunction with the accompanying drawings, in which a preferred embodiment is illustrated by way of example. The scope of the invention is pointed out in the appended claims. In the drawing, FIG. 1 is a schematic diagram of an improved trim surface control system, in accordance with this invention, and FIGS. 2a–2d are wave forms to aid in explaining the operation of the control system of FIG. 1.

Briefly, a trim surface control system in accordance with this invention employs a low frequency oscillator and magnetic amplifier combination for producing pulses of constant magnitude and of a duration which corresponds to the position of the trim surface. Transistor amplifiers are employed to insure that the voltage applied to the trim surface control motor during each pulse is the maximum or rated voltage for such motor. A fail-safe provision is made whereby a control voltage persisting beyond a predetermined period is utilized to actuate a relay to turn off the autopilot.

The invention will be described with reference to the yaw channel of an aircraft; it will be apparent, however, that it may be used in the pitch or roll channels. Referring to FIG. 1, the main rudder surface 4 is controlled from a control surface actuator 5, which may be a conventional clutch-controlled motor having a pair of clutches (not shown) which control its direction of rotation in accordance with which clutch is energized. Signals applied to actuator 5 are derived from a servo amplifier 6 of the type having a dual channel output for developing direct current signals of a magnitude and sense corresponding to the magnitude and phase of alternating current input signals thereto. Typical of such an amplifier is the circuit described and claimed in a copending application of James G. Hinsdale, entitled "Transistor Phase Discriminator," Serial No. 618,380, filed October 25, 1950, now Patent No. 2,897,379, and assigned to the same assignee as the present application.

A lateral accelerometer 7 applies to servo amplifier 6 signals which represent the resultant of gravity and centrifugal forces acting on a mass (not shown), all in a conventional manner. As is well known, such forces will be equal and opposite when the aircraft is in wings-level flight, or when the aircraft is in a turn and such turn is properly coordinated. A rate gyroscope 8 develops signals representing yawing rate. However, a high pass filter 9 connected between the rate gyroscope 8 and servo amplifier 6 serves to permit only rate gyro signals representing short-term or transient conditions to be applied to the servo amplifier 6. In this manner, signals which would command manipulation of rudder 4 to alter the turn, i.e., rate gyro signals representing long-term conditions, are prevented from affecting the system.

A saturable-core oscillator 10 is provided which utilizes a pair of transistors 12, 14 having their collector electrodes 16, 18 connected to the ends of a center-tapped primary winding 20 of the saturable-core transformer 22. The base electrodes are connected to the ends of a tickler coil 24, the center tap 26 thereof and the emitter electrodes 28, 30 of the transistors being connected to the positive terminal B+ of a direct current supply source, as indicated.

Oscillator 10 operates in the manner of a conventional saturable-core oscillator, wherein voltage in one half of primary winding 20 builds up to a maximum, at which point the magnetic field collapses and voltage in the other half of the primary winding builds up to such maximum, where the magnetic field again collapses and the cycle is re-initiated. However, and in accordance with this invention, the saturable core and windings are designed so that the output of the oscillator, which appears across secondary windings 34, 36, is a square wave (see FIG. 2a) of very low frequency, e.g., one cycle per second. The importance of this feature will be made more evident hereafter.

Secondary windings 34, 36 are connected at one end to respective base electrodes 38, 40 of transistors 42, 44. The collector electrodes 46, 48 of such transistors are connected through respective current limiting resistors 50, 52 to a point of reference or ground potential. Connected between the remaining ends of secondary windings 34, 36 and the emitter electrodes 54, 56 of transistors 42, 44 are the load windings 60, 62 of respective saturable-core reactors 64, 66. The bias windings 68, 70 of such reactors are each connected to ground at one end through respective resistors 72, 74 and at their other ends across a potentiometer resistor 76. The sliding contact 78 of such potentiometer is coupled through a resistor 80 to the positive terminal B+ of the main direct current supply source. The control windings 82, 84 of the reactors are connected between the respective output channels of servo amplifier 6 and actuator 5.

Assume that the aircraft is out of trim in yaw, resulting in wing-down condition. An output signal is developed by accelerometer 7 which would command actuator 5 to produce a continuous output to move the rudder to restore the aircraft to wings-level flight, i.e, to trim the aircraft. It is the function of this invention to utilize the output of servo amplifier 6 to actuate the rudder trim tab or trim surface 90 to provide the needed trimming.

A feature of this invention resides in the use of the emitter and base electrodes of each of transistors 42 and 44 to provide the function of a diode which is essential in conjunction with the load windings of saturable-core reactors to provide a magnetic amplifier or pulse-width modulator. Thus, transistors 42, 44 not only function as conventional transistor amplifiers, but they also provide the essential diode functions to complete the magnetic amplifiers.

Sliding contact 78 is positioned so that the bias voltages appearing across the bias windings 68 and 70 are at a value to bias the magnetic amplifiers to cut-off in the absence of signals in the control windings 82, 84. It should be noted that for conventional operation of magnetic amplifiers under such conditions, minimum current would flow through the diode of a magnetic amplifier, i.e., the emitter-base path of transistors 42, 44, during the positive half cycles of the oscillator output voltage (see the dotted current pulses in FIG. 2b). Such an output is effectively reduced to zero in the circuit of this invention by applying across the emitter-base connections a counteracting direct current voltage. For this purpose, and by way of example, an alternating current reference voltage is applied to the primary winding 110 of a transformer 112 having a pair of secondary windings 114, 116. Respective rectifiers 118, 120 are connected to secondary windings 114, 116, the output leads of rectifier 118 being connected to the emitter 54 and base 38 of transistor 42, and the output leads of rectifier 120 being connected to the emitter 56 and base 40 of transistor 44. The polarities of the direct current voltages in the outputs of rectifiers 118 and 120 are phased so as to counteract the minimum current flow through the load windings 60, 62 in the absence of signals in the control windings 82, 84, whereupon substantially no current flows through transistors 42, 44 in the absence of voltages across control windings 82, 84. Resistors 121 and 122 shunting secondary windings 34, 36 are provided to isolate such windings and the associated magnetic amplifier load windings 60, 62.

Additional amplifiers are provided to raise voltages appearing on the emitters 54, 56 when transistors 42 and 44 are conducting. Such amplifiers comprise successive transistors 124, 126 and 128, 130 having their emitter-base current paths connected in series with the emitters 54 and 56 of transistors 42, 44. As shown, the collector circuits of transistors 124 and 128 are connected to ground through respective current-limiting resistors 132, 134. The emitters 136, 138 of transistors 126, 130 are connected to B+ and the collector electrodes 140, 142 of such transistors are connected through a pair of resistors 144, 146, to the junction 148 which is connected through a capacitor 150 to ground.

The motor 152 for controlling trim tab 90 is shown schematically as a split field series motor, wherein one end of each winding 154, 156 is connected to the ungrounded brush 158 of the rotor 160. The remaining ends of the split windings are connected through respective unidirectional conductive devices, illustrated as diodes 162, 164, to the collector electrodes 140, 142 of the final amplifiers 126, 130. Diodes 162 and 164 constitute preferred means for isolating amplifiers 126, 130 from voltages used in manually controlling motor 152, as through a switch 165 which is adapted to connect one or the other of windings 154, 156 to a point of positive potential.

Figure 2A:
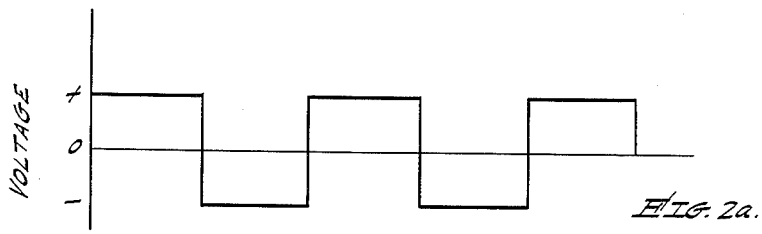
Figure 2B:
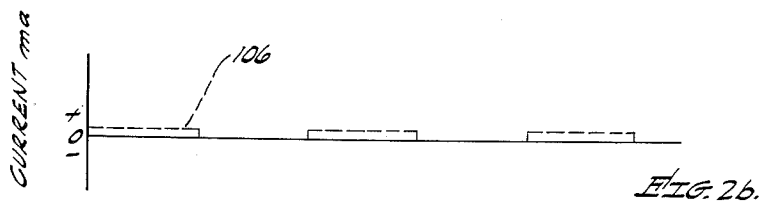
Figure 2C:
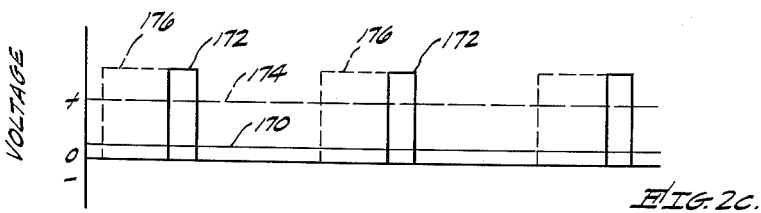
Figure 2D:
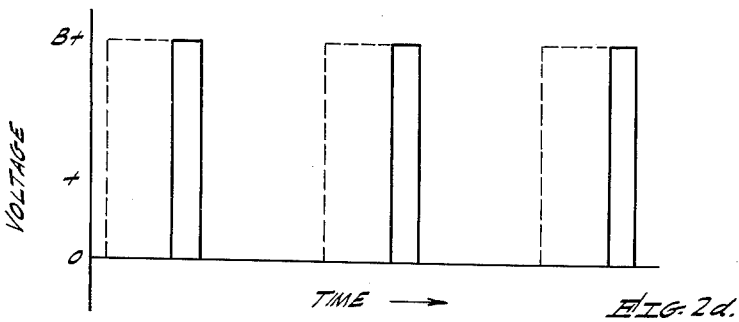

FIG. 2c illustrates voltage wave forms appearing at the collector 46 of transistor 42 with respect to ground in the presence of direct current control voltages across control winding 82. The effect of the magnetic amplifier in the presence of a D.-C. control signal is to establish an output voltage of constant magnitude, the duration of which depends upon the magnitude of the control signal. Referring to FIG. 2c, a small control signal, indicated at 170, results in unidirectional pulses 172 which terminate with the trailing edge of the positive half of the square wave oscillator voltage, and which is established or exists for a period corresponding to the magnitude of the direct current control signal 170. A larger direct current control signal, indicated at 174, results in unidirectional pulses 176 which exist for a correspondingly longer period. It will be understood that similar pulses will appear at the collector 48 of transistor 44 for direct current control signals applied to control winding 84 of magnetic amplifier 66.

Referring to transistor 42, it should be noted that such transistor is non-conducting in the absence of control signals across control winding 82. This in turn means there is no emitter-base potential difference for transistors 124, 126. When a control signal causes base electrode 38 of transistor 42 to be negative with respect to emitter 54, an emitter-base potential difference is automatically established for transistors 124, 126, resulting in collector 140 of transistor 126 being placed at substantially B+ potential for the pulse periods (see FIG. 2d). Diode 162 is poled to permit voltages appearing at collector 140 to be applied to winding 154, whereupon rotor 160 is operated to move trim tab 90 in one direction corresponding to the magnitude of the control signal on control winding 82. Similarly, direct current voltages applied to control winding 84 of magnetic amplifier 66 cause winding 156 to be energized and the same operation takes place to operate rotor 160 and trim tab 90 in the opposite direction. Upon trim tab 90 reaching a position where the aircraft is in trim, the outputs of rate gyro 8 and accelerometer 7, and hence servo amplifier 6, are reduced to zero; consequently, actuator 5 is no longer continuously loaded.

To facilitate operation of the system in the desired manner, the control windings 82, 84 of the magnetic amplifiers are provided with respective variable resistors 180, 182 in series therewith, and respective resistors 184, 186 shunt these series arrangements. Adjustment of variable resistors 180, 182 controls current flow through the control windings 82, 84, and hence the gain of the system; therefore, such adjustment aids in establishing operation of trim tab 90 to correct even minute off-trim conditions. Generally, only a small portion of the total current need be directed through a control winding, the major part by-passing the control windings and being applied directly to servo 5. Also, it has been found that the inductance of the control winding may lower the response time of the servo 5 if all the current is directed through the control winding; applying most of the current directly to the servo is necessary to avoid any such delay in its response to the output of servo amplifier 6.

As previously indicated, the low-frequency output of oscillator 10 is of advantage in the system of this invention. If motor 152 is of the type requiring its full rated voltage to be applied in order for it to operate at full speed, this voltage must be available for a sufficient time to allow the motor to get up to speed and the gearing to be actuated to move trim tab 90. By using an extremely low frequency oscillator as herein described, such operation is assured. For example, the motor may require 0.01-second to come up to full speed when its rated voltage is applied. By adjusting resistors 180, 182, minimum control signal can be made sufficiently strong to insure the existence of rated voltage for operation of the motor for a long enough period to effect operation of trim tab 90.

If the oscillator frequency was very high, e.g., 1,000 c.p.s., it can readily be seen that, although rated voltage may be applied to the motor, it would not be available for a sufficient time to allow the motor to come up to speed, and trim tab 90 would not be actuated.

On the other hand, to tolerable oscillator frequency depends upon the frequency response characteristics of the particular motor. Thus, if a motor is capable of coming up to speed within a very brief interval, e.g., .001 second, the motor would operate satisfactorily at a higher oscillator frequency, e.g., 10–100 c.p.s.

A relay control coil 190 is connected at its ungrounded end to the junction 148 of resistors 144 and 146. The armature 192 of the relay is adapted in the unenergized condition to provide a completed connection to the master control switch of the autopilot, as indicated, and when energized to turn off the autopilot master control switch. Capacitor 150 and the respective resistors 144, 148 have a time constant such that, should voltage appearing at collector 140 or 142 of transistors 126, 130 persist for a predetermined period, coil 190 will be energized to actuate its armature 192 and turn off the master control switch. Thus a fail-safe device is provided whereby a signal commanding movement in the control surface 4 to a position which would cause undesirable stress on the alternating current is prevented from being utilized by the complete turning off of the autopilot. It should be noted that, as a common practice, the rate gyroscope 8 and lateral accelerometer 7 are part of the autopilot, and, therefore, the outputs of rate gyroscope 8 and lateral accelerometer 7 reduce to zero when the master control switch is actuated. This, in turn, reduces the control signal to zero, and the control surface 4 remains in the position it was in before the undesired signal actuated the master control switch. Preferably, the time constant is such that the relay would be energized if collector voltage persisted longer than a half cycle of the frequency of oscillator 10, i.e., in this case a half second. Of course, it will be apparent that time constants may be employed where collector voltage persists for considerably more than a half cycle or a cycle, but in no event should it be so short that the relay would be energized within less than a half cycle.

From the foregoing, it will be apparent that this invention provides a novel pulse modulation scheme for controlling the trim portion of a control surface of an aircraft, wherein rated voltage for the trim surface control motor is applied in the form of pulses of constant magnitude but which have a duration depending upon the magnitude of the displacement of the trim surface from the correct position for aircraft trim, such voltages being derived from a low frequency oscillator and magnetic amplifier combination wherein direct current voltages representing the off-trim condition of the aircraft are modulated to form pulses which, following amplification, are applied to the control motor.

Although the invention has been described and illustrated as employing p-n-p junction transistors, it will be apparent that n-p-n junctions may also be used, in which case the polarities dealt with would be reversed.

What is claimed is:

1. In an aircraft having a control surface provided with a trim tab, actuating means for said control surface, a control motor for operating said trim tab having a characteristic response time within which to respond to control voltages, means to develop cyclical signals representing corrective action of the control surface to keep the aircraft in trim, means responsive to said signals to develop a direct current voltage of a magnitude corresponding to the magnitude of said cyclical signal and of a sense corresponding to the phase of said cyclical signal, first and second magnetic amplifiers each having a load winding, a control winding and a bias winding, each of said control windings being connected between said actuating means and said direct current voltage developing means, a saturable-core oscillator having first and second secondary windings, said oscillator developing across said secondary windings an alternating voltage of a frequency which is long with respect to the response time of said control motor, first and second transistors each having emitter, base and collector electrodes, respective secondary windings and load windings being connected in circuit between the respective emitter and base electrodes, said emitter electrodes being connected to a direct current potential, said bias windings being biased to prevent current flow through said transistors in the absence of direct current voltages applied to said control windings, said collector electrodes being connected to said control motor, said magnetic amplifiers being effective upon the application of direct current voltages to the control windings thereof for establishing emitter-collector current flow through said transistors to place said collector electrodes at said direct current potential for periods during each cycle of said alternating voltage which correspond to the magnitude of said direct current voltages, and said control motor being operative during said periods to move said trim tab to a position where said direct current voltages are reduced to zero.

2. The combination defined in claim 1, further including means in circuit with said control windings to cause a major portion of said direct current voltages to be applied directly to said actuating means for said control surface.

3. The combination defined in claim 2, wherein said last claimed means includes a time constant network for measuring the duration of said control signal pulses, relay control means coupled to said time constant means, said time constant means operating to energize said relay control means when said control signal pulses exist for longer than a predetermined period, and means actuated by said relay control means in the energized condition thereof to prevent operation of said actuating means and control motor.

4. For use in a trim surface control system for aircraft, wherein the trim surface control motor is to be operated in response to time-modulated pulses, the combination comprising reactor means having a bias winding, a control winding and a load winding all in mutually inductive relation, a transistor having emitter, base and collector electrodes, said load winding being connected in circuit with the emitter-base current path of said transistor, said reactor means together with the emitter-base connection with said load winding forming a magnetic amplifier, means to apply a cyclical voltage to said load winding, means connected to said bias winding to limit emitter-base current flow to a minimum level when said control is not energized, means to apply a direct current control voltage to said control winding, and said magnetic amplifier in the presence of a direct current control voltage across said control winding effecting emitter-base current flow through said transistor during a predetermined portion of each cycle of said cyclical voltage to establish at said collector electrode voltage pulses of constant magnitude and of a duration corresponding to the magnitude of the direct current voltage applied to said control winding.

5. The combination defined in claim 1, further including means connected between said emitter and base electrodes to develop a unidirectional voltage of a sense and magnitude to prevent said minimum emitter-base current flow in the absence of voltages applied to said control winding.

References Cited in the file of this patent

UNITED STATES PATENTS

| | | |
|---|---|---|
| Re. 23,938 | Curry | Feb. 8, 1955 |
| 2,440,320 | Young | Apr. 27, 1948 |
| 2,626,114 | Alderson | Jan. 20, 1953 |
| 2,673,314 | MacCallum | Mar. 23, 1954 |
| 2,774,559 | MacCallum | Dec. 18, 1956 |
| 2,780,782 | Bright | Feb. 5, 1957 |
| 2,934,291 | Hamilton | Apr. 26, 1960 |